United States Patent
Pandian et al.

(10) Patent No.: US 10,164,961 B2
(45) Date of Patent: *Dec. 25, 2018

(54) DYNAMIC WEB SERVICES SERVER

(71) Applicant: Ivanti, Inc., South Jordan, UT (US)

(72) Inventors: Suresh S. Pandian, Cupertino, CA (US); Udo H. Waibel, Los Altos, CA (US); Hong Hauw, San Ramon, CA (US); Andrii Zavgorodnii, San Jose, CA (US); Sundarapandian Sabapathy, Pleasanton, CA (US); Shaohua Yao, San Ramon, CA (US); Randy Jessee, Tracy, CA (US); Roland Poklemba, San Ramon, CA (US)

(73) Assignee: Ivanti, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,130

(22) Filed: Apr. 24, 2017

(65) Prior Publication Data

US 2018/0077132 A1    Mar. 15, 2018

Related U.S. Application Data

(63) Continuation of application No. 14/864,747, filed on Sep. 24, 2015, now Pat. No. 9,635,007.

(51) Int. Cl.
*H04L 29/06* (2006.01)
*H04L 29/08* (2006.01)
*H04L 12/24* (2006.01)
*G06F 17/30* (2006.01)

(52) U.S. Cl.
CPC .......... *H04L 63/08* (2013.01); *G06F 17/3089* (2013.01); *H04L 41/0246* (2013.01); *H04L 63/102* (2013.01); *H04L 67/02* (2013.01); *H04L 67/20* (2013.01); *H04L 67/2814* (2013.01); *H04L 67/2823* (2013.01); *H04L 67/327* (2013.01); *H04L 63/123* (2013.01)

(58) Field of Classification Search
CPC ..................................................... H04L 63/08
USPC ........................................................... 726/2
See application file for complete search history.

(56) References Cited

U.S. PATENT DOCUMENTS

| | | |
|---|---|---|
| 7,702,724 B1 | 4/2010 | Brydon et al. |
| 8,209,407 B2 | 6/2012 | Warner et al. |
| 8,782,065 B2 | 7/2014 | Maresca |

(Continued)

*Primary Examiner* — Longbit Chai

(57) ABSTRACT

A method is provided for a multi-tenant system to accept web service calls from third party systems over a computer network. The method includes centrally receiving messages with different endpoint URLs from the third party systems over the computer network and processing each message by parsing an endpoint URL of the message to identify a tenant and an action for a payload of the message and authenticating the message. When the message is authenticated, the method further includes generating an acknowledgment of the message based on the identified tenant and the identified action and sending the acknowledgment over the computer network, routing the payload, the identified tenant, and the identified the action to a queue based on the identified tenant, retrieving the payload, the identified tenant, and the identified action from the queue, determining a user script corresponding to the identified action, and executing the user script on the payload.

20 Claims, 7 Drawing Sheets

(56) References Cited

U.S. PATENT DOCUMENTS

| | | |
|---|---|---|
| 9,635,007 B2 | 4/2017 | Pandian et al. |
| 2007/0255718 A1 | 11/2007 | Baikov et al. |
| 2012/0084351 A1* | 4/2012 | Yato .................... G06Q 10/101 709/203 |
| 2012/0143938 A1 | 6/2012 | du Preez et al. |

* cited by examiner

DYNAMIC WEB SERVICES SERVER

CROSS-REFERENCE TO RELATED APPLICATIONS

This application is a continuation of and claims priority to U.S. patent application Ser. No. 14/864,747, filed Sep. 24, 2015, entitled "Dynamic Web Services Server," now issues as U.S. Pat. No. 9,635,007, which is hereby incorporated by reference.

BACKGROUND

While all major platforms can access the Internet using web browsers, they could not interact with each other over the Internet. For these platforms to work together, web-applications were developed. Web-applications are applications that run on the web. These are built around the web browser standards and can be used by any browser on any platform.

Web services allow an application to publish its function or message to the rest of the world. Web services use Extensible Markup Language (XML) to code and to decode data, and Simple Object Access Protocol (SOAP) to transport it (using open protocols). Web services can help to solve the interoperability problem by giving different applications and different platforms a way to link their data.

BRIEF DESCRIPTION OF THE DRAWINGS

In the drawings.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on. The term "or" is used to refer to a nonexclusive such that "A or B" includes "A but not B," "B but not A," and "A and B" unless otherwise indicated.

To set up a web service, a user logs into a first software system and creates an outbound message by setting an endpoint Uniform Resource Locator (URL) for the message and selecting fields to be included in the message. The first software system publishes a Web Service Description Language (WSDL) file that describes how the web service can be called, what parameters it expects, and what data structures it returns. Based on the WSDL, a second software system creates web service logic with classes and methods to call, receive, and process the fields in the message.

When fields in a message change, the first software system publishes a new WSDL. Based on the new WSDL, the second software system has to change its web service logic by adding new classes and methods to receive and process the fields in the message, which involves code change, testing, and deployment. Thus what is needed is a software system with an architecture that reduces the amount of code change, testing, and deployment when inbound messages change.

In examples of the present disclosure, a multi-tenant system has a web server that centrally accepts all kinds of web service call messages. The web server queues payloads of the web service call messages in different queues based the end point URLs of the web service calls. The payloads are retrieved and processed by different user scripts based the end point URLs of the web service calls. In this architecture the web server remains static when a web service changes. Only the user scripts are updated to accommodate the web service change.

Figure 1:
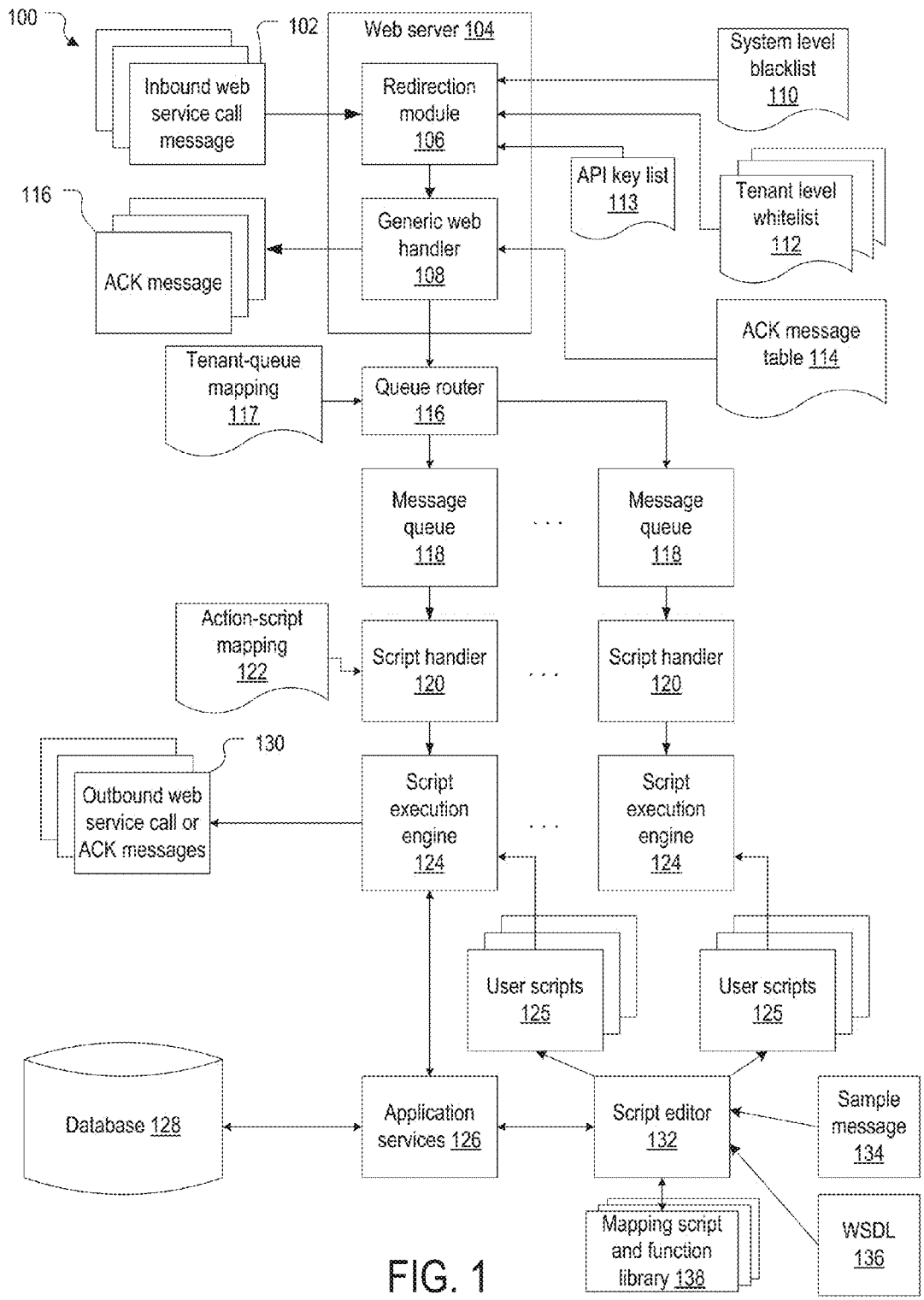
FIG. 1 is a block diagram of a multi-tenant system that accepts inbound web service call messages from third party systems in examples of the present disclosure.

FIG. 1 is a block diagram of a multi-tenant system 100 that accepts inbound web service call messages 102 (hereafter "web service calls 102") from third party software systems (not shown) in examples of the present disclosure. Web service calls 102 may be stateless so they do not affect each other. Web service calls 102 may be SOAP messages with third party fields inside. Web service calls 102 may have different endpoint URLs addressed to different web service pages to receive the web service calls.

System 100 includes a web server 104 that accepts any inbound web service call 102 from any third party system that have endpoint URLs with a common hostname but different paths or query parameters. Web server 104 includes a redirection module 106 and a generic web handler 108 (e.g., a generic .ashx handler). For each web service call 102, redirection module 106 authenticates the web service call. As part of the authentication, redirection module 106 identifies the tenant and the action of web service call 102. Once a web service call 102 is authenticated, redirection module 106 provides the identified tenant, the identified action, and the payload of the web service call to generic web handler 108.

Generic web handler 108 looks up an acknowledgment message 106 for the identified tenant and the identified action of web service call 102 from an acknowledgment message table 114. If a corresponding acknowledgment message 106 for the identified tenant and the identified action is found, generic web handler 108 sends the acknowledgement message. Generic web handler 108 converts the payload of web service call 102 to a different format, such as a JavaScript Object Notation (JSON), creates a queue message with the identified tenant, the identified action, and the payload, and passes the queue message to a queue router 116 in system 100.

Queue router 116 maps the identified tenant in the queue message to a queue 118 from a number of queues 118 and passes the queue message to that queue.

A script handler 120 retrieves and processes queue messages from queue 118. Script handler 120 maps the identified action to a user script 125 (e.g., a JavaScript) from a number of user scripts 125 and causes a script execution engine 124 (e.g., a JavaScript engine) to execute the user script with the payload in the queue message as input. Script execution engine 124 has a library of functions that may be called to manipulate fields and access (read or write) a database 128 that is part of system 100. Executing user script 125, script execution engine 124 may call application services 126 to read or write database 128 or generate an outbound web service call or acknowledgment message 130 to a third party system (e.g., to read or write a third party database). The above description applies to pipelines for other tenants where each pipeline includes a message queue 118, a script handler 120, a script execution engine 124, and user scripts 125.

A script editor 132 provides a user interface to create user scripts 125. To create a new inbound web service connection, script editor 132 may receive a sample inbound web service call message 134 and map new fields in the message to fields in database 128. To create a new outbound web service connection, script editor 132 may receive a WSDL 136 and map fields in database 128 to fields described in the WSDL. Afterwards script editor 132 makes the new fields available to create user scripts.

System 100 may be implemented on server computers and storage systems. For example, (1) web server 104 may be implemented on a server computer or a cluster of server computers, (2) router 116, message queue 118, and script handler 120 may be implemented on a server computer or a cluster of server computers, (3) script execution engine 124 and script editor 132 may be implemented on a server computer or a cluster of server computers, (4) application services 126 may be implemented on a server computer or a cluster of server computers, and (5) database 128 may be implemented on a storage area network (SAN) or network area storage (NAS).

Figure 2:
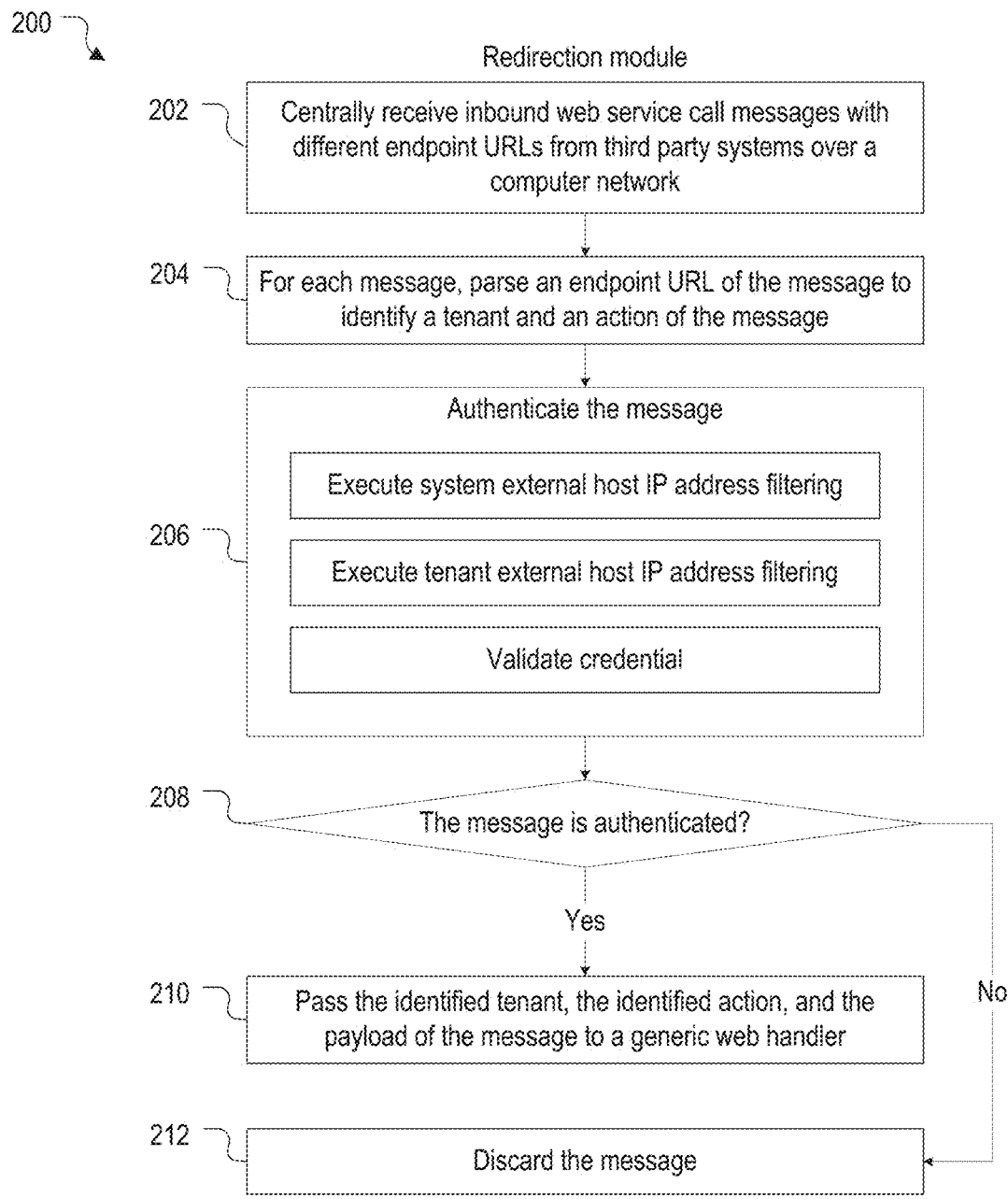
FIG. 2 is a flowchart of a method performed by a redirection module of FIG. 1 in examples of the present disclosure.

FIG. 2 is a flowchart of a method 200 performed by redirection module 106 (FIG. 1) in examples of the present disclosure. Method 200 may be executed by a processor of a server computer executing computer readable codes of redirection module 106. Method 200 and other methods described herein may include one or more operations, functions, or actions illustrated by one or more blocks. Although the blocks of method 200 and other methods described herein are illustrated in sequential orders, these blocks may also be performed in parallel, or in a different order than those described herein. Also, the various blocks may be combined into fewer blocks, divided into additional blocks, or eliminated based upon the desired implementation. Method 200 may begin in block 202.

In block 202, redirection module 106 centrally receives inbound web service call messages 102 with different endpoint URLs from third party systems over a computer network. Each endpoint URL includes a hostname of web server 104, a path identifying a tenant and an action, and a query string identifying a customer defined Application Programming Interface (API) key. Block 202 may be followed by block 204.

In block 204, redirection module 106 parses an endpoint URL of a web service call 102 to identify a tenant, an action, and an API key of the web service call. Block 204 may be followed by block 206.

In block 206, redirection module 106 authenticates web service call 102. Block 206 includes sub-blocks 206-1, 206-2, and 206-3.

In sub-block 206-1, redirection module 106 performs system level external host IP address filtering. Redirection module 106 may identify the external host IP address of web service call 102 and compare it against a blacklist 110 (FIG. 1). When the external host IP address of web service call 102 is not blacklisted, sub-block 206-1 may be followed by sub-block 206-2. Otherwise sub-block 206-1 may proceed to block 208.

In sub-block 206-2, redirection module 106 performs tenant level external host IP address filtering. Each tenant creates a white list 112. Redirection module 106 may map the identified tenant to its whitelist 112, and compare the external host IP address of web service call 102 against the whitelist. When the external host IP address of web service call 102 is whitelisted, sub-block 206-2 may be followed by sub-block 206-3. Otherwise sub-block 206-2 may proceed to block 208.

In sub-block 206-3, redirection module 106 performs credential validation. Redirection module 106 may compare the identified API key against a recorded API key for the identified tenant in an API key list 113 (FIG. 1). When the credential of web service call 102 is validated, sub-block 206-3 may be followed by block 208. Otherwise sub-block 206-3 may proceed to block 208.

In block 208, redirection module 106 determines if web service call 102 has been authenticated. If so, block 208 may be followed by block 210. Otherwise block 208 may be followed by block 212.

In block 210, redirection module 106 passes the identified tenant, the identified action, and the payload of web service call 102 to generic web handler 112 (FIG. 1). Redirection module 106 may also pass the query string in the endpoint URL of web service call 102 to generic web handler 112. Instead of passing the identified tenant, the identified action, and the query string as individual elements, redirection module 106 may pass the entire endpoint URL to generic web handler 112.

In block 212, redirection module 106 discards web service call 102.

Figure 3:
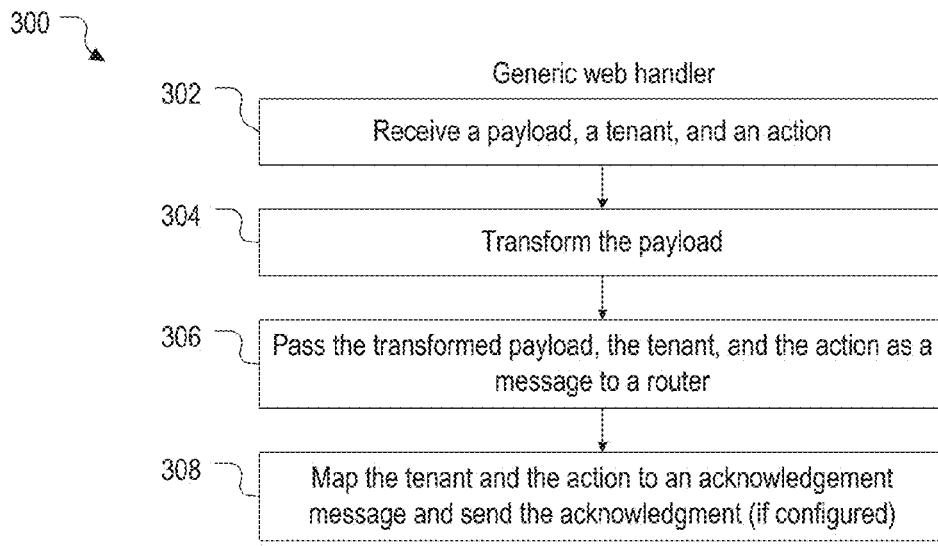
FIG. 3 is a flowchart of a method performed by a generic web handler of FIG. 1 in examples of the present disclosure.

FIG. 3 is a flowchart of a method 300 performed by generic web handler 112 (FIG. 1) in examples of the present disclosure. Method 300 may be executed by a processor of a server computer executing computer readable codes of generic web handler 112. Method 300 may begin in block 302.

In block 302, generic web handler 112 receives an identified tenant, an identified action, a payload, and a query string in the endpoint URL of a web service call 102 from redirection module 106. Block 302 may be followed by block 304.

In block 304, generic web handler 112 transforms the payload of web service call 102 to a different format, such as JSON, that is compatible with script execution engine 124 (FIG. 1) and user scripts 125. Generic web handler 112 may also append the query string to the beginning of the payload, which allows hardcoded values to be passed to script execution (described later) regardless of the content inside the message. Block 304 may be followed by block 306.

In block 306, generic web handler 112 generates a queue message including the identified tenant, the identified action, and the payload of web service call 102 and passes the queue message to router 116 (FIG. 1). Instead of including the identified tenant and the identified action as individual elements, generic web handler 112 may include the entire endpoint URL in the queue message. Block 306 may be followed by block 308.

In block 308, generic web handler 112 looks up an acknowledgment message 106 (FIG. 1) for the identified tenant and the identified action from acknowledgment message table 114 (FIG. 1). If an acknowledgment message 106 for the identified tenant and the identified action is found, generic web handler 112 sends the acknowledgement message.

Figure 4:
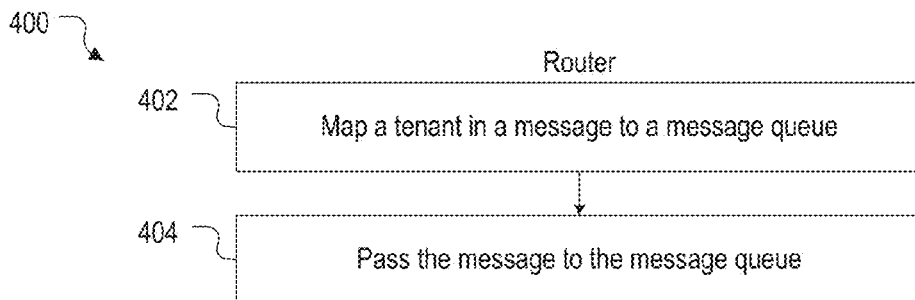
FIG. 4 is a flowchart of a method performed by a router of FIG. 1 in examples of the present disclosure.

FIG. 4 is a flowchart of a method 400 performed by queue router 116 (FIG. 1) in examples of the present disclosure. Method 400 may be executed by a processor of a server computer executing computer readable codes of queue router 116. Method 400 may begin in block 402.

In block 402, queue router 116 references a tenant-queue mapping 117 (FIG. 1) to map an identified tenant (or the entire endpoint URL) in a queue message to a message queue 118 (FIG. 1). Block 402 may be followed by block 404.

In block 404, queue router 116 passes the queue message to message queue 118.

Figure 5:
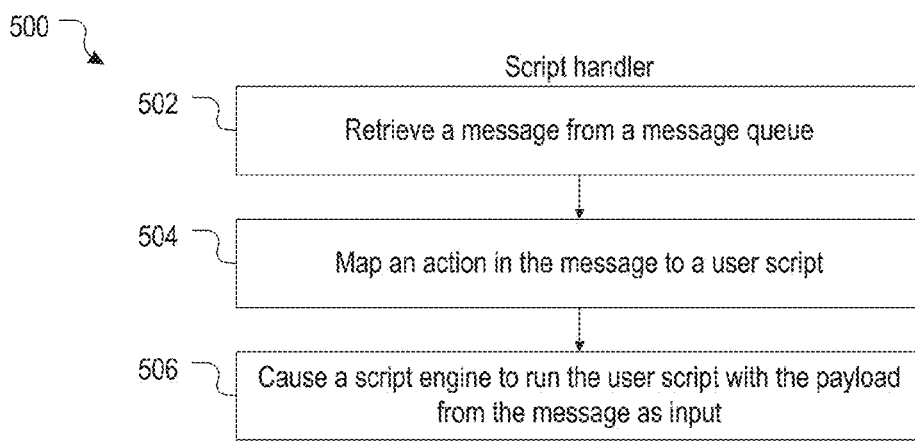
FIG. 5 is a flowchart of a method performed by a script handler of FIG. 1 in examples of the present disclosure.

FIG. 5 is a flowchart of a method 500 performed by script handler 120 (FIG. 1) in examples of the present disclosure. Method 500 may be executed by a processor of a server computer executing computer readable codes of script handler 120. Method 500 may begin in block 502.

In block 502, script handler 120 retrieves a queue message from a corresponding queue 118. Script handler 120 may retrieve queue messages from queue 118 in a first-in first-out order. Block 502 may be followed by block 504.

In block 504, script handler 120 references an action-script mapping 122 (FIG. 1) to map an identified action (or the entire endpoint URL) in the queue message to a user script 125 (FIG. 1). Block 504 may be followed by block 506.

In block 506, script handler 120 calls script engine 124 to run user script 125 with the payload in the queue message as input.

Figure 6:
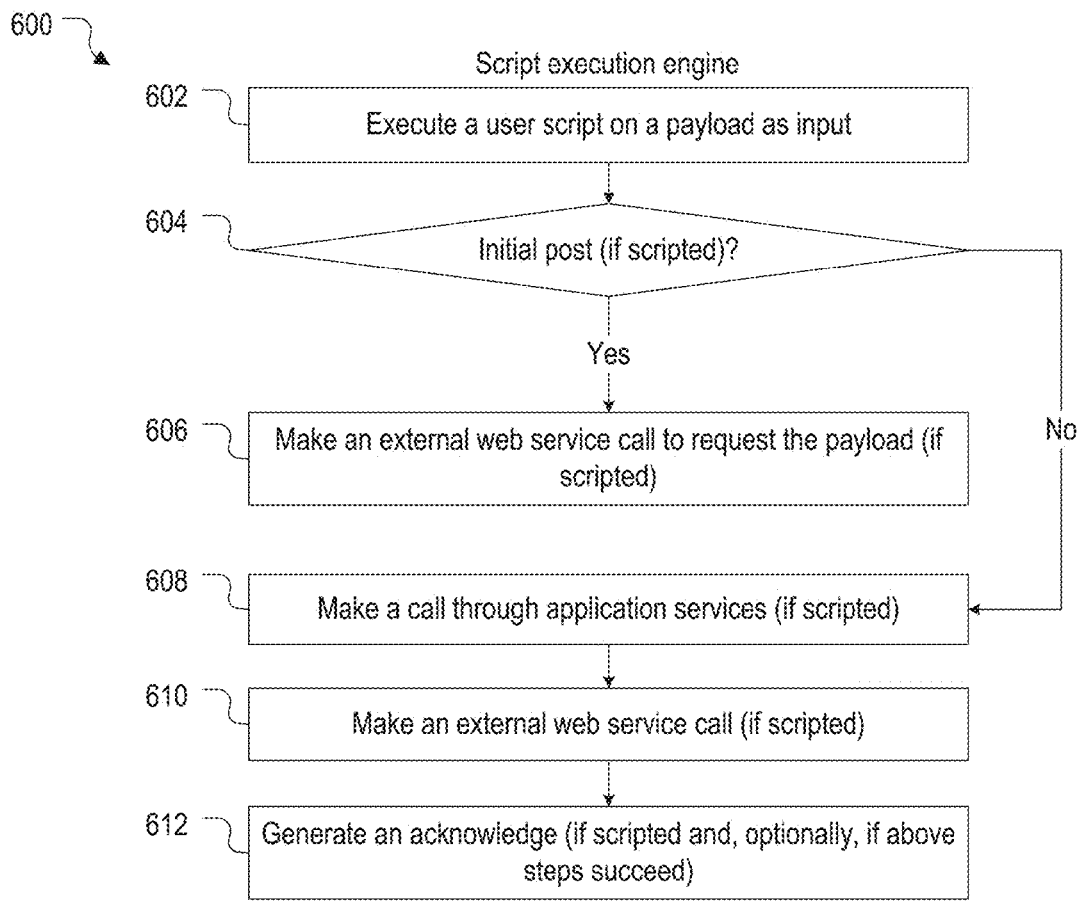
FIG. 6 is a flowchart of a method performed by a script execution engine of FIG. 1 in examples of the present disclosure.

FIG. 6 is a flowchart of a method 600 performed by script execution engine 124 (FIG. 1) in examples of the present disclosure. Method 600 may be executed by a processor of a server computer executing computer readable codes of script execution engine 124. Method 600 may begin in block 602.

In block 602, script execution engine 124 executes a user script 125 with a payload of a queue message as input in response to script handler 120 (FIG. 1). Block 602 may be followed by optional blocks 604 to 610, which depend on how user script 125 is defined.

In optional block 604, if so scripted, script execution engine 124 determines if the payload is from an initial request to accept the payload data (e.g., an initial HTTP post). If so, optional block 604 may be followed by optional block 606. Otherwise optional block 604 may be followed by optional block 608.

In optional block 606, if so scripted, script execution engine 124 uses a session ID and an object ID to make an external web service call to the external host to request the payload data again. Any response would be processed by redirection module 106 (FIG. 1) as a new inbound web service call.

In optional block 608, if so scripted, script execution engine 124 makes a call to application services 126 (FIG. 1) to read or write database 128 (FIG. 1). The write to database 128 may be with a computed value calculated from one or more fields in the payload received through a web service call 102. Optional block 608 may be followed by optional block 610.

In optional block 610, if so scripted, script execution engine 124 makes an external web service call 130 (e.g., to read or write a third party database). External web service call 126 may include a computed value calculated from one or more fields in the payload received through a web service call 102. Optional block 610 may be followed by optional block 612.

In optional block 612, if so scripted, script execution engine 124 generates and sends an acknowledgement 126. In some examples script execution engine 124 generates and sends acknowledgment 126 only when the preceding scripted actions succeed without error.

Figure 7:
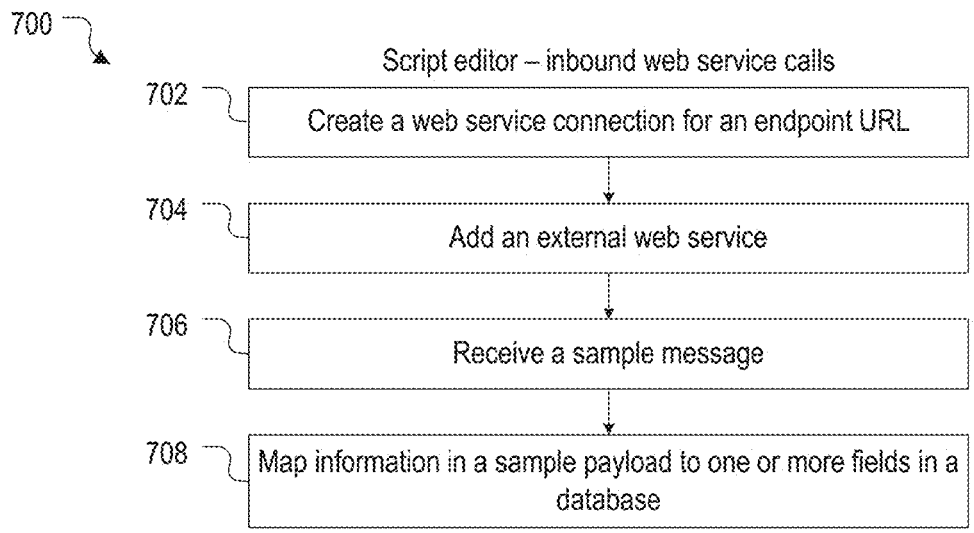
FIG. 7 is a flowchart of a method performed by a script editor of FIG. 1 to map fields in an inbound web service call message in examples of the present disclosure.
Figure 8:
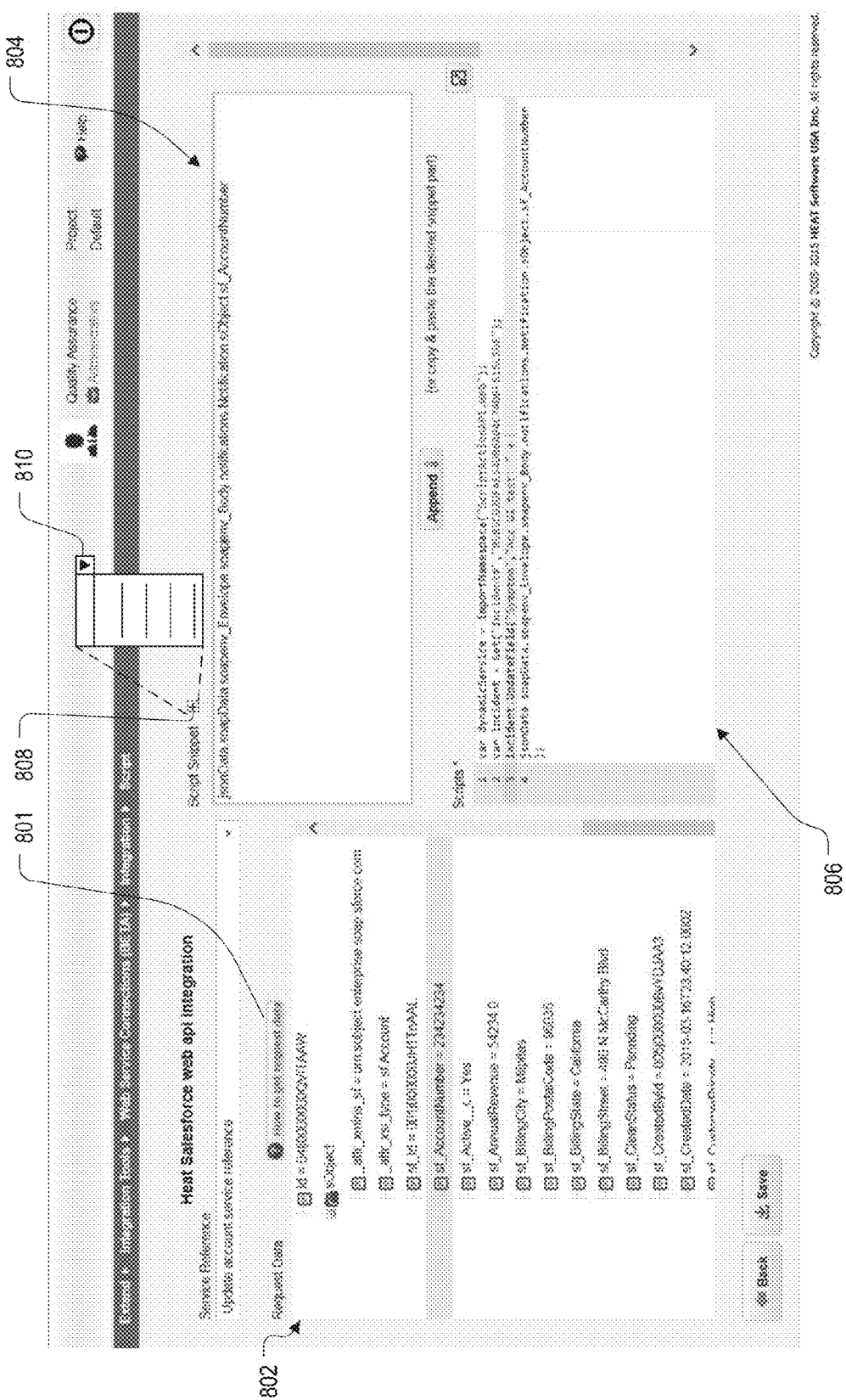
FIG. 8 is a graphical user interface for the script editor of FIG. 1 in examples of the present disclosure.

FIG. 7 is a flowchart of a method 700 performed by script editor 132 (FIG. 1) to create a web service connection to receive web service calls from one or more external web services in examples of the present disclosure. FIG. 8 shows a GUI for script editor 132 in examples of the present disclosure. Method 700 may be executed by a processor of a server computer executing computer readable codes of script editor 132 in response to user input. Referring to FIG. 7, method 700 may begin in block 702.

In block 702, script editor 132 creates a web service connection from a third party system. For example, the user provides a name (also called "integration name") and a description for the web service connection. The user may also provide a fixed acknowledgment message 116 for the web service connection, which script editor 132 saves under the web service connection in acknowledgement message table 114 (FIG. 1). When a fixed acknowledgment is not accepted by the third party system, a user script 125 that processes an external web service may be scripted to generate a dynamic acknowledgement for the web service call. Prior to creating the web service connection, the user may set an API key and add one or more IP addresses of the third party system to its tenant level whitelist 112. Block 702 may be followed by block 704.

In block 704, script editor 132 adds an external web service to the web service connection. For example, the user provides a name (also called "service reference") and an endpoint URL (also called "service address") for the external web service. The user would use the same endpoint URL is used to create an outbound web service call 102 at the third party system.

Script editor 132 also saves the endpoint URL under the web service connection in acknowledgement message table 114 (FIG. 1) so the fixed acknowledgement message 116 is sent in response to a corresponding inbound web service call 102. Block 704 may be followed by block 706.

In block 706, script editor 132 receives a sample web service call message 134 (FIG. 1) from an external web service. This may occur automatically when the user selects a button 801 (FIG. 8) on the GUI for script editor 132 to request the third party system to send a sample web service call 134 or the user manually builds and sends a sample web service call 134 using a HTTP request builder based on prior knowledge of the third party system. Sample web service call 134 is processed by redirection module 106 and generic web handler 108, and then routed by queue router 116 directly to script editor 132. Block 706 may be followed by block 708.

In block 708, script editor 132 maps information in the sample payload of service call 134 to one or more fields in database 128. Script editor 132 parses out the sample payload and displays a tree of third party fields (also called "request data") in a first pane 802 (FIG. 8) of a GUI for the script editor. When the user selects a third party field, script editor 132 generates a script snippet of the selected third party field as a script variable in a second pane 804 (FIG. 8) of the GUI. Script editor 132 allows the user to edit the script snippet and append it to a script in a third pane 806 (FIG. 8) of the GUI. Script editor 132 also allows the user to edit the script to map information in the payload to one or more fields in database 128. This mapping script (e.g., lines 1 to 3 in pane 806) is saved in a library 138 (FIG. 1) of the web service connection for future reference. For other web service calls having the same third party fields, the user may press a script snippet button 808 (FIG. 8) and select the mapping script from a list 810 (FIG. 8) of functions in library 138 to retrieve a script snippet in pane 804 and append it to the script in pane 806 as needed. The user may also select a function (e.g., to manipulate third party fields and write the result to database 128) from list 810 to retrieves a script snippet for that function to pane 804 and append it to a script in pane 806 as needed. When script snippets in the script share one or more variables, script editor 132 may reuse the variables from prior inserted script snippet instead of again appending the same variables to the script.

Blocks 704 and 708 may be repeated to add external web services to the web service connection.

Figure 9:
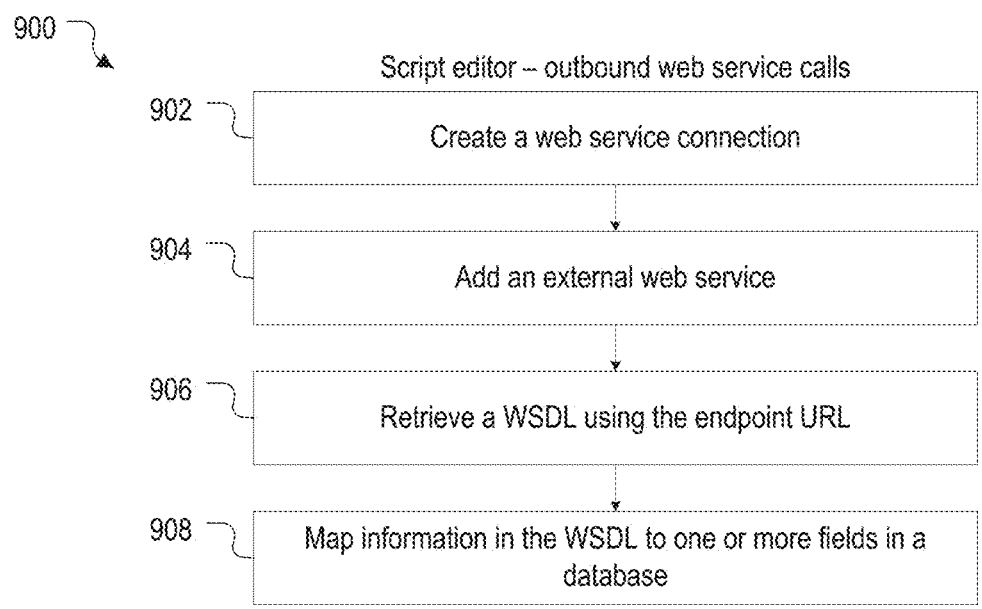
FIG. 9 is a flowchart of a method performed by the script editor of FIG. 1 to map fields in a WSDL in examples of the present disclosure.
Figure 10:
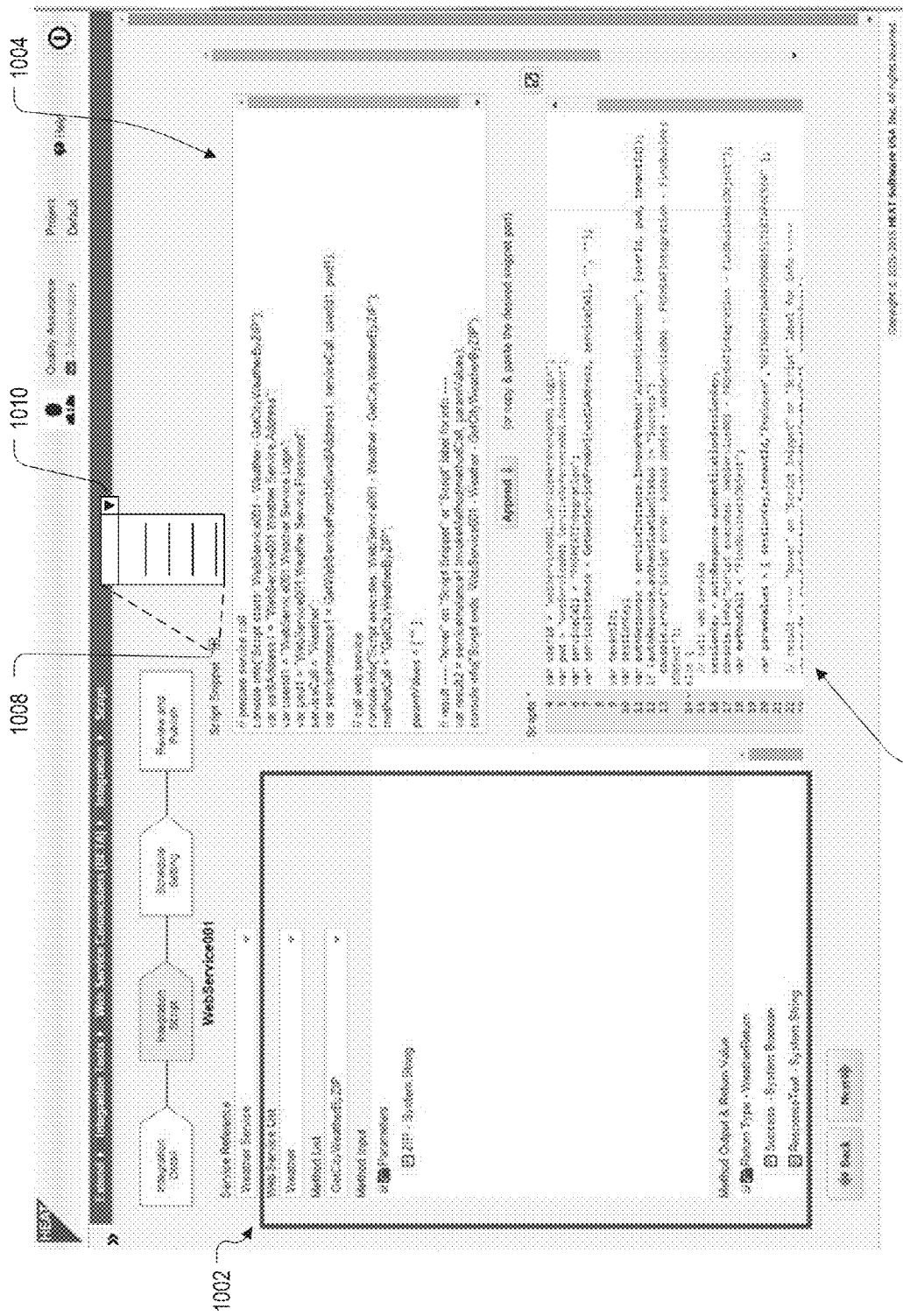
FIG. 10 is a graphical user interface for the script editor of FIG. 1 in examples of the present disclosure.

FIG. 9 is a flowchart of a method 900 performed by script editor 132 (FIG. 1) to create a web service connection to call one or more external web services in examples of the present disclosure. FIG. 10 shows a GUI for script editor 132 in examples of the present disclosure. Method 900 may be executed by a processor of a server computer executing computer readable codes of script editor 132 in response to user input. Referring to FIG. 9, method 900 may begin in block 902.

In block 902, script editor 132 creates a web service connection to one or more third party systems. For example, the user provides a name (also called "integration name") and a description for the web service connection. Block 902 may be followed by block 904.

In block 904, script editor 132 adds an external web service to the web service connection by saving its endpoint URLs to the web service connection. For example, the user provides a name (also called "service reference") and an endpoint URL (also called "service URL"). Instead of an endpoint URL, the user may provide a WSDL 136 (FIG. 1) for the external web service. If the external web service requires authentication, the user may also provide a user name and a password. Block 904 may be followed by optional block 906.

In optional block 906, if the user did not provide a WSDL 136 in block 904, script editor 132 uses the endpoint URL to download the WSDL for the external web service. Script editor 132 may convert WSDL 136 into a different format, such as JSON. Block 906 may be followed by block 908.

In block 906, script editor 132 maps information in database 128 to information in WSDL 136. Script editor 132 parses out the converted WSDL and displays a list of third party web services, a list of third party methods under the selected web service, a first tree of third party input fields under the selected method, and a second tree of third party output fields under the selected method in a first pane 1002 (FIG. 10) of a GUI for the script editor. When the user selects a third party field, script editor 132 generates a script snippet of the selected third party field as a script variable in a second pane 1004 of the GUI. Script editor 132 allows the user to edit the script snippet and append it to a script in a third pane 1006 (FIG. 10) of the GUI. Script editor 132 also allows the user to edit the script to map information in WSDL 136 to information in database 128. This mapping script is saved in library 138 (FIG. 1) of the web service connection for future reference. For other web service calls having the same third party fields, the user may press a script snippet button 1008 (FIG. 10) and select the mapping script from a list 1010 (FIG. 10) of functions in library 138 to retrieve a script snippet and append it to the script in pane 1006 as needed. The user may also select a function (e.g., to manipulate fields in database 128 and send the result as a third party field in an outbound web service call to a third message system) from list 1008 to retrieves a script snippet for that function to pane 804 and append it to the script in pane 806 as needed. When script snippets in a script share one or more variables, script editor 132 may reuse the variables from a prior inserted script snippet instead of again appending the same variables to the script.

Blocks 904 and 908 may be repeated to add external web services to the web service connection.

Various other adaptations and combinations of features of the embodiments disclosed are within the scope of the present disclosure. Numerous embodiments are encompassed by the following claims.

What is claimed is:

1. An apparatus, comprising:
a memory; and
a hardware processor operatively coupled to the memory, the hardware processor configured to:
 receive a web service call message including an end point Uniform Resource Locator (URL) and a payload in a first format;
 parse the end point URL in the web service call message to identify a tenant and an action;
 transform the payload in the first format into a second format compatible with a script execution engine from a plurality of script execution engines, each script execution engine from the plurality of script execution engines associated with a queue from a plurality of queues;
 responsive to the transforming the payload, generate a queue message (i) including an identifier of the tenant, an identifier of the action, and the payload in the second format and (ii) associated with the web service call message including the end point URL; and
 send the queue message that has been generated to a compute device, such that the compute device in response to receiving the queue message routes the queue message based on the identifier of the tenant to the queue from the plurality of queues and associated with the script execution engine to, subsequent to the routing, execute a user script (i) with the payload in the queue message that has been generated as an input to the user script and (ii) selected based on the identifier of the action in the queue message that has been generated.

2. The apparatus of claim 1, wherein the hardware processor is further configured to:
 parse the end point URL to identify an Application Programming Interface (API) key;
 determine an Internet Protocol (IP) address associated with the web service call message; and
 authenticate the web service call message using the end point URL and the IP address by:

determining that the IP address is not included in a first list of IP addresses associated with a third-party system, the web service call message associated with the third-party system;

determining that the IP address is included in a second list of IP addresses associated with the tenant; and determining that the API key matches a predefined API key associated with the tenant, the hardware processor configured to transform the payload after authenticating the web service call message.

3. The apparatus of claim 1, wherein the hardware processor is configured to receive the web service call message from a third-party system, the hardware processor further configured to:

determine that an acknowledgment message identifier in a table of acknowledgement messages is associated with the tenant and the action; and send, in response to determining that the acknowledgement message identifier in the table is associated with the tenant and the action, an acknowledgement message associated with the acknowledgement message identifier to the third-party system.

4. The apparatus of claim 1, wherein the hardware processor is configured to receive the web service call message from a third-party system from a plurality of third-party systems, each third-party system from the plurality of third-party systems associated with a computing platform different from a computing platform for at least one other third-party system from the plurality of third-party systems.

5. The apparatus of claim 1, wherein the first format is Simple Object Access Protocol (SOAP) and the second format is JavaScript Object Notation (JSON).

6. The apparatus of claim 1, wherein the hardware processor is further configured to:

parse the end point URL to identify a query string; and append the query string to a beginning of the payload in the second format.

7. The apparatus of claim 1, wherein the queue message includes the end point URL.

8. The apparatus of claim 1, wherein the compute device is a first compute device and the web service call message is received from a second compute device, the hardware processor further configured to:

generate, after the sending, an acknowledgement message based on the action; and send the acknowledgement message to the second compute device.

9. The apparatus of claim 1, wherein the hardware processor is further configured to:

receive, from a device of a user, an edit to the user script; and modify the user script to include the edit from the device of the user.

10. A method, comprising:

receiving a web service call message including an end point Uniform Resource Locator (URL) and a payload in a first format;

parsing the end point URL in the web service call message to identify a tenant and an action;

transforming the payload in the first format into a second format compatible with a script execution engine from a plurality of script execution engines, each script execution engine from the plurality of script execution engines associated with a queue from a plurality of queues;

responsive to the transforming of the payload, generating a queue message (i) including an identifier of the tenant, an identifier of the action, and the payload in the second format and (ii) associated with the web service call message including the end point URL; and sending the queue message that has been generated to a compute device, such that the compute device in response to receiving the queue message routes the queue message based on the identifier of the tenant to the queue from the plurality of queues and associated with the script execution engine to, subsequent to the routing, execute a user script (i) with the payload in the queue message that has been generated as an input to the user script and (ii) selected based on the identifier of the action in the queue message that has been generated.

11. The method of claim 10, further comprising:

parsing the end point URL to identify an Application Programming Interface (API) key;

determining an Internet Protocol (IP) address associated with the web service call message; and authenticating the web service call message using the end point URL and the IP address by:

determining that the IP address is not included in a first list of IP addresses associated with a third-party system, the web service call message associated with the third-party system;

determining that the IP address is included in a second list of IP addresses associated with the tenant; and determining that the API key matches a predefined API key associated with the tenant, the transforming the payload occurring after the authenticating the web service call message.

12. The method of claim 10, wherein the receiving includes receiving the web service call message from a third-party system, the method further comprising:

determining that an acknowledgment message identifier in a table of acknowledgement messages is associated with the tenant and the action; and sending, in response to determining that the acknowledgement message identifier in the table is associated with the tenant and the action, an acknowledgement message associated with the acknowledgement message identifier to the third-party system.

13. The method of claim 10, wherein the receiving includes receiving the web service call message from a third-party system from a plurality of third-party systems, each third-party system from the plurality of third-party systems associated with a computing platform different from a computing platform for at least one other third-party system from the plurality of third-party systems.

14. The method of claim 10, wherein the first format is Simple Object Access Protocol (SOAP) and the second format is JavaScript Object Notation (JSON).

15. The method of claim 10, further comprising:

parsing the end point URL to identify a query string; and appending the query string to a beginning of the payload in the second format.

16. A non-transitory processor-readable medium storing code representing instructions to be executed by a hardware processor, the code comprising code to cause the hardware processor to:

parse an end point Uniform Resource Locator (URL) in a web service call message to identify a tenant and an action, the web service call message including the end point URL and a payload in a first format;

transform the payload in the first format into a second format compatible with a script execution engine from a plurality of script execution engines, each script execution engine from the plurality of script execution engines associated with a queue from a plurality of queues;

responsive to the transforming the payload, generate a queue message (i) including an identifier of the tenant, an identifier of the action, and the payload in the second format and (ii) associated with the web service call message including the end point URL; and send the queue message that has been generated to a compute device, such that the compute device in response to receiving the queue message routes the queue message based on the identifier of the tenant to the queue from the plurality of queues and associated with the script execution engine to, subsequent to the routing, execute a user script (i) with the payload in the queue message that has been generated as an input to the user script and (ii) selected based on the identifier of the action in the queue message that has been generated.

17. The non-transitory processor-readable medium of claim 16, the code further comprising code to cause the hardware processor to:

parse the end point URL to identify an Application Programming Interface (API) key;

determine an Internet Protocol (IP) address associated with the web service call message; and authenticate the web service call message using the end point URL and the IP address by:

determining that the IP address is not included in a first list of IP addresses associated with a third-party system, the web service call message associated with the third-party system;

determining that the IP address is included in a second list of IP addresses associated with the tenant; and determining that the API key matches a predefined API key associated with the tenant, the code to cause the hardware processor to transform the payload including code to cause the hardware processor to transform the payload after authenticating the web service call message.

18. The non-transitory processor-readable medium of claim 16, wherein the web service call message is received from a third-party system, the code further comprising code to cause the hardware processor to:

determine that an acknowledgment message identifier in a table of acknowledgement messages is associated with the tenant and the action; and send, in response to determining that the acknowledgement message identifier in the table is associated with the tenant and the action, an acknowledgement message associated with the acknowledgement message identifier to the third-party system.

19. The non-transitory processor-readable medium of claim 16, wherein the first format is Simple Object Access Protocol (SOAP) and the second format is JavaScript Object Notation (JSON).

20. The non-transitory processor-readable medium of claim 16, wherein the code further comprises code to cause the hardware processor to:

parse the end point URL to identify a query string; and append the query string to a beginning of the payload in the second format.

* * * * *